Aug. 5, 1958 E. W. MAHLAND ET AL 2,846,573
HETERODYNING RECEIVING SYSTEM
Filed Oct. 23, 1956
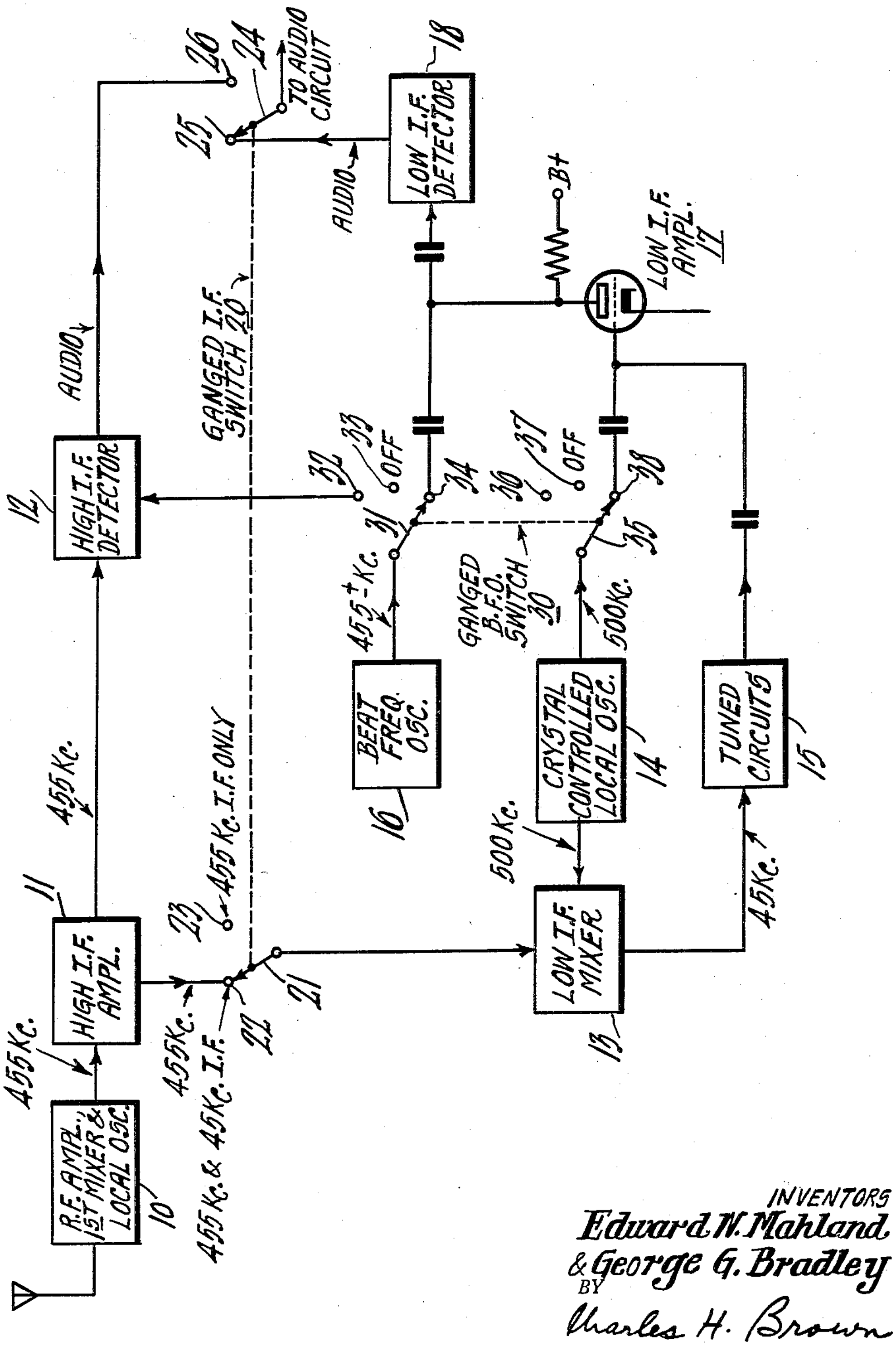
INVENTORS
Edward W. Mahland
& George G. Bradley
BY
Charles H. Brown
ATTORNEY United States Patent Office 2,846,573 Patented Aug. 5, 1958

2,846,573

HETERODYNING RECEIVING SYSTEM

Edward W. Mahland, Hollis, N. Y., and George G. Bradley, Sudbury, Mass., assignors to Radio Corporation of America, a corporation of Delaware Application October 23, 1956, Serial No. 617,771

5 Claims. (Cl. 250—20)

The invention relates to heterodyning systems, and particularly to heterodyning systems for use in superheterodyne radio receivers having a plurality of intermediate frequencies and associated circuitry.

In radio communications, continuous wave (C. W.) signals are often used. When such continuous wave signals are received, it is customary to heterodyne the received signal at some intermediate frequency with a signal produced by a beat frequency oscillator to produce an audible signal. In superheterodyne radio receivers, the beat frequency oscillator signal is generally applied to the intermediate frequency circuitry of the receiver at a point just ahead of the detector circuit of the receiver so that the bandwidth provided by the intermediate frequency circuits does not affect the frequency range or the amplitude of the audible signal. It is also known to employ in communications receivers two intermediate frequency systems each having a different intermediate frequency. One of the intermediate frequencies, generally the higher one, is generally used to provide broad bandwidth, and the other of the intermediate frequencies, usually the lower one, is generally connected in cascade with the higher intermediate frequency system to provide a narrow bandwidth. A beat frequency oscillator, arranged to produce a signal having a frequency that is substantially equal to the higher intermediate frequency and connected into the higher intermediate frequency circuitry, produces the usual audible beat note at the higher intermediate frequency detector. However, when the lower intermediate frequency system is connected in cascade with the higher intermediate frequency system, the narrow bandwidth of the lower intermediate frequency system reduces the sidebands from which the audible signal is obtained at the lower intermediate frequency detector so that this audible signal is seriously reduced in amplitude.

An object of the invention is to provide a beat frequency circuit arrangement in which one beat frequency oscillator can be used with either of two frequencies to produce an audible signal.

Another object of the invention is to provide a beat frequency circuit arrangement that can be used with either of two intermediate frequency circuits to produce an audible signal having a frequency range and amplitude that is unaffected by the bandwidth of either of the intermediate frequency circuits.

Another object is to provide a beat frequency circuit arrangement for a superheterodyne communications receiver having selectable bandwidths in which one beat frequency oscillator can be used with either of two intermediate frequency circuits to produce an audible signal having a frequency range and amplitude that is unaffected by the bandwidth of either of the two intermediate frequency circuits.

Briefly, these and other objects are accomplished in a superheterodyne communications receiver having two intermediate frequency (I. F.) systems of different frequencies. A beat frequency oscillator produces a signal having a frequency substantially the same as but differing slightly from one intermediate frequency of one I. F. system. A local oscillator is provided for producing a signal having a frequency that differs from the intermediate frequency of the first I. F. system by an amount that is substantially equal to the intermediate frequency of the second I. F. system. Switching means are provided for alternatively coupling the beat frequency oscillator to the first intermediate frequency system, or for coupling both the beat frequency oscillator and the local oscillator to the second intermediate frequency system. The signal which constitutes the intermediate frequency for the first I. F. system is combined with the output of the local oscillator to provide the intermediate frequency for the second I. F. system. The switching means connects either of the intermediate frequency systems to a common audio circuit. The arrangement of this switching circuit is such that the switching means permits changing from broad to narrow selectivity for continuous wave (C. W.) operation without affecting the beat note or its amplitude.

The invention is explained in detail in connection with the accompanying drawing, in which the single figure shows a block diagram of a radio receiver utilizing one embodiment of the invention. Incoming signals are received by a conventional antenna system and applied to apparatus 10 which includes a conventional radio frequency amplifier, first mixer, and local oscillator for converting the received signals to an intermediate frequency. As an example, it is assumed that the high intermediate frequency signals derived from the first mixer are assumed to have a frequency of 455 kc. These high intermediate frequency signals are applied to a conventional high intermediate frequency amplifier 11, which may comprise one or more stages of amplification. The high intermediate frequency amplifier 11 feeds two intermediate frequency systems. One of these I. F. systems includes a high intermediate frequency detector 12, which is supplied by the amplifier 11 and produces audio frequency signals in response to the high intermediate frequency signals of 455 kc. The other intermediate frequency system is assumed to operate at 45 kc. and includes a low I. F. mixer 13 and highly selective tuned circuits 15 tuned to pass the 45 kc. signal. It is assumed that the 455 kc. intermediate frequency provides broad bandwidth and the 45 kc. intermediate frequency provides narrow bandwidth.

High or low (actually a combination of high and low) intermediate frequency signals may be selected by a ganged intermediate frequency switch 20 which is a two-position switch having two blades 21, 24. The first blade 21 of the ganged intermediate frequency switch 20 is coupled to a low intermediate frequency mixer 13. The first contact 22 associated with the first blade 21 is coupled to an output of the high intermediate frequency amplifier 11, and the second contact 23 associated with the first blade 21 is left unconnected. The second blade 24 of the ganged intermediate frequency switch 20 is coupled to the audio circuit of the receiver. The first contact 25 associated with the second blade 24 is coupled to a low intermediate frequency detector 18, and the second contact 26 associated with the second blade 24 is coupled to the high intermediate frequency detector 12. The ganged intermediate frequency switch 20 is arranged so that both blades 21, 24 simultaneously engage either their respective first contacts 22, 25 in one position or their respective second contacts 23, 26 in the other position. A local oscillator 14, preferably crystal-controlled and having a high frequency stability, is coupled to the low intermediate frequency mixer 13. This local oscillator 14 produces signals having a frequency that differs from the high intermediate frequency by an amount substantially equal to the low 45 kc. intermediate frequency and may be either a 500 kc. or a 410 kc. oscillator. In this particular case, the local oscillator signals were chosen to have a frequency greater than the high intermediate frequency because this local oscillator 14 is also used as a crystal calibrator giving frequency check points every 500 kc. up to 30 mc. A beat frequency oscillator 16 is also provided. This oscillator 16 may be tunable to permit varying the pitch of the audible signals produced when the beat frequency oscillator 16 is used. In the example, this oscillator 16 produces signals having a frequency that is tunable for several kilocycles about a center frequency of 455 kc. so as to provide an output slightly greater or less than the 455 kc. I. F. output from the amplifier 11.

The beat frequency oscillator signals from the oscillator 16 are applied to the appropriate intermediate frequency circuit by means of a ganged beat frequency oscillator switch 30 which is a three-position switch having two blades 31, 35. The first blade 31 of the beat frequency oscillator switch 30 has three contacts 32, 33, 34 associated with it, and the second blade 35 also has three contacts 36, 37, 38 associated with it. The output circuit of the beat frequency oscillator 16 is coupled to the first blade 31 of the ganged beat frequency oscillator switch 30, and an output circuit of the local oscillator 14 is coupled to the second blade 35 of the ganged beat frequency oscillator switch 30. The first contact 32 is coupled to the high intermediate frequency detector 12. The contacts 33, 36 and 37 are left unconnected. The second contacts 33, 37 (marked "off" in the drawing) are provided so that the beat frequency oscillator 16 may be disconnected from both of the intermediate frequency circuits. The third contacts 34, 38 associated with the first and second blades 31, 35 are connected in a manner which will be explained. The ganged beat frequency oscillator switch 30 is arranged so that both blades 31, 35 simultaneously engage either their respective first contacts 32, 36 in one position, or their respective second contacts 33, 37 in the second position, or their respective third contacts 34, 38 in the third position.

The low intermediate frequency amplifier 17 may comprise one or more stages of amplification which, for the purposes of illustration, is shown as an electron discharge tube having at least an anode, a cathode, and a control grid as shown. While all the circuit connections for the electron discharge tube are not shown, it is to be understood that this tube is to be connected in a conventional manner. The control grid of the electron discharge tube is capacitively coupled to the output circuit of the tuned circuits 15 and is also capacitively coupled to the third contact 38 of the ganged beat frequency oscillator switch 30. The anode of the electron discharge tube is capacitively coupled to the third contact 34 associated with the first blade 31 of the ganged beat frequency oscillator switch 30, and is also capacitively coupled to the low intermediate frequency detector 18.

When the receiver is in operation, either the high intermediate frequency, 455 kc. in the example, or the low intermediate frequency (actually the combination of both the high and low intermediate frequencies), 45 kc. in the example, may be selected by operating the ganged intermediate frequency switch 20 to either of the two positions indicated. If only the high intermediate frequency in one I. F. system is to be used, the blades 21, 24 of the ganged intermediate frequency switch 20 are positioned to engage their second contacts 23, 26, respectively. In this condition, the high intermediate frequency amplifier 11 is disconnected from the low intermediate frequency mixer 13, and the audio circuit is connected to the high intermediate frequency detector 12. This is the condition for the receiver to receive and detect voice signals. When, however, it is desired to receive continuous wave signals over the same high frequency I. F. system and to make the detected continuous wave signals audible, the blades 31, 35 of the ganged beat frequency oscillator switch 30 are positioned to engage their first contacts 32, 36, respectively. In this position of the switch, the beat frequency oscillator 16 is coupled to the high intermediate frequency detector 12, where the beat frequency oscillator signals having a frequency, for example, of 454 kc. and the high intermediate frequency signals of 455 kc. are heterodyned to provide an audible beat note, which in this example would be 1 kc., for continuous wave reception.

If, however, low intermediate frequency signals of 45 kc. are to be used, the blades 21, 24 of the ganged intermediate frequency switch 20 are positioned to engage their first contacts 22, 25 respectively. In this condition, the high intermediate frequency amplifier 11 is coupled to the low intermediate frequency mixer 13, and the audio circuit is disconnected from the high intermediate frequency detector 12 and is coupled to the low intermediate frequency detector 18. The low intermediate frequency mixer 13 heterodynes the high intermediate frequency signals, 455 kc. in the example, with the 500 kc. signals produced by the local oscillator 14 to produce low intermediate frequency signals of 45 kc. These low intermediate frequency signals pass thru the tuned circuits 15 and thru the low intermediate frequency amplifier 17, and are detected in the low intermediate frequency detector 18 to produce audible signals. If it is desired to receive continuous wave signals over the low I. F. system and make these C. W. waves audible, the blades 31, 35 of the ganged beat frequency oscillator switch 30 are positioned to engage the third contacts 34, 38, respectively. In this condition, local oscillator signals 500 kc. in the example, are coupled to the control grid of the electron discharge tube, and beat frequency oscillator signals, having a frequency for example of 454 kc., are coupled to the anode of the electron discharge tube. The combined local oscillator signals and the beat frequency oscillator signals are effectively heterodyned in the low intermediate frequency detector 18 to produce signals which, in this example, would have a frequency of 46 kc. When these signals of 46 kc. are combined with the low intermediate frequency signals of 45 kc. from the low intermediate frequency amplifier 17, the two signals are heterodyned to provide an audible beat note of 1 kc. for continuous wave reception.

As previously indicated, the pitch of the audible signals, produced for both the high and low intermediate frequency signals, may be varied by tuning the beat frequency oscillator 16. Since the same beat frequency oscillator 16 can be combined with the intermediate frequency signals of either I. F. system in their respective detectors, the amplitude and frequency range of the audible beat note is not affected by the difference in bandwidth of the intermediate frequency circuits. In addition, incoming, continuous wave signals can be tuned in by using the high intermediate frequency system (having a broad bandwidth), and then further tuned in by using the low intermediate frequency system (having a narrow bandwidth) without the audible beat note changing in frequency.

Thus, a radio receiver utilizing the invention needs only one beat frequency oscillator to provide audible signals with either of two intermediate frequency signals. Furthermore, the frequency and amplitude of the audible signals are unaffected by the selectivity of either of the intermediate frequency systems.

The invention claimed is:

1. Beat frequency heterodyning apparatus having selectable first and second intermediate frequency systems each respectively adapted to pass first and second intermedaite frequency signals, comprising a beat frequency oscillator for producing signals having a frequency substantially the same as but different from said first intermediate frequency, a local oscillator for producing signals having a frequency that differs from said first intermediate frequency by an amount that is substantially equal to said second intermediate frequency, and switching means for alternatively coupling said beat frequency oscillator to said first intermediate frequency system or for coupling both said beat frequency oscillator and said local oscillator to said second intermediate frequency system.

2. Beat frequency heterodyning apparatus having selectable first and second intermediate frequency systems each respectively adapted to pass first and second intermediate frequency signals, comprising a beat frequency oscillator for producing signals having a frequency substantially the same as but different from said first intermediate frequency, said second intermediate frequency system including mixing means, a local oscillator for producing signals having a frequency that differs from said first intermediate frequency by an amount that is substantially equal to said second intermediate frequency, said local oscillator being coupled to said mixing means, and switching means for alternatively coupling said beat frequency oscillator to said first intermediate frequency system when said first intermediate frequency system is selected or for coupling said beat frequency oscillator and said local oscillator to said second intermediate frequency system when said second intermediate frequency system is selected.

3. A beat frequency heterodyning arrangement comprising a first intermediate frequency system having at least a first detector, a second intermediate frequency system having at least a mixer and a second detector, each of said systems being adapted to pass first and second intermediate frequency signals respectively, a beat frequency oscillator for producing signals having a frequency substantially the same as but different from said first intermediate frequency, a local oscillator for producing signals having a frequency that differs from said first intermediate frequency by an amount that is substantially equal to said second intermediate frequency, means coupling said local oscillator to said mixer, means coupling said mixer to said second detector, an input for applying said first intermediate frequency to said arrangement, means coupling said source of said first detector, an audio circuit, switching means for coupling said audio circuit to said first detector when said first intermediate frequency system is selected, or for coupling said audio circuit to said second detector and for coupling said mixer to said input when said second intermediate frequency system is selected, and other switching means for alternatively coupling said beat frequency oscillator to said first detector when beat frequency signals for said first intermediate frequency system are desired, or for coupling both said beat frequency oscillator and said local oscillator to said second detector when beat frequency signals for said second intermediate frequency system are desired.

4. A beat frequency heterodyning arrangement comprising a first intermediate frequency system having at least a first intermediate frequency amplifier and a first detector, a second intermediate frequency system having at least a mixer and a second detector, each of said systems being adapted to pass first and second intermediate frequency signals respectively, a beat frequency oscillator for producing signals having a frequency substantially the same as but different from said first intermediate frequency, a local oscillator for producing signals having a frequency substantially equal to the sum of said first and said second intermediate frequencies, means coupling said local oscillator to said mixer, means coupling the output of said mixer to said second detector, means coupling said first intermediate frequency amplifier to said first detector, an audio circuit, switching means for coupling said audio circuit to said first detector when said first intermediate frequency system is selected, or for coupling said audio circuit to said second detector and also coupling said first intermediate frequency amplifier to said mixer when said second intermediate frequency system is selected, and other switching means for alternatively coupling said beat frequency oscillator to said first detector when beat frequency signals for said first intermediate frequency system are desired, or for coupling both said beat frequency oscillator and said local oscillator to said second detector when beat frequency signals for said second intermediate frequency system are desired.

5. The beat frequency heterodyning arrangement as claimed in claim 4, wherein said first intermediate frequency is substantially equal to 455 kc., said second intermediate frequency is substantially equal to 45 kc., and said beat frequency oscillator comprises an oscillator arrangement that is tunable about a frequency of 455 kc.

References Cited in the file of this patent

UNITED STATES PATENTS

| | | |
|---|---|---|
| 1,724,019 | Harper | Aug. 13, 1929 |
| 2,186,146 | Plebanski | Jan. 9, 1940 |
| 2,186,455 | Goldmark | Jan. 9, 1940 |
| 2,295,408 | Koch | Sept. 8, 1942 |
| 2,301,649 | Thompson | Nov. 10, 1942 |
| 2,362,958 | Sandretto | Nov. 14, 1944 |